2,744,312

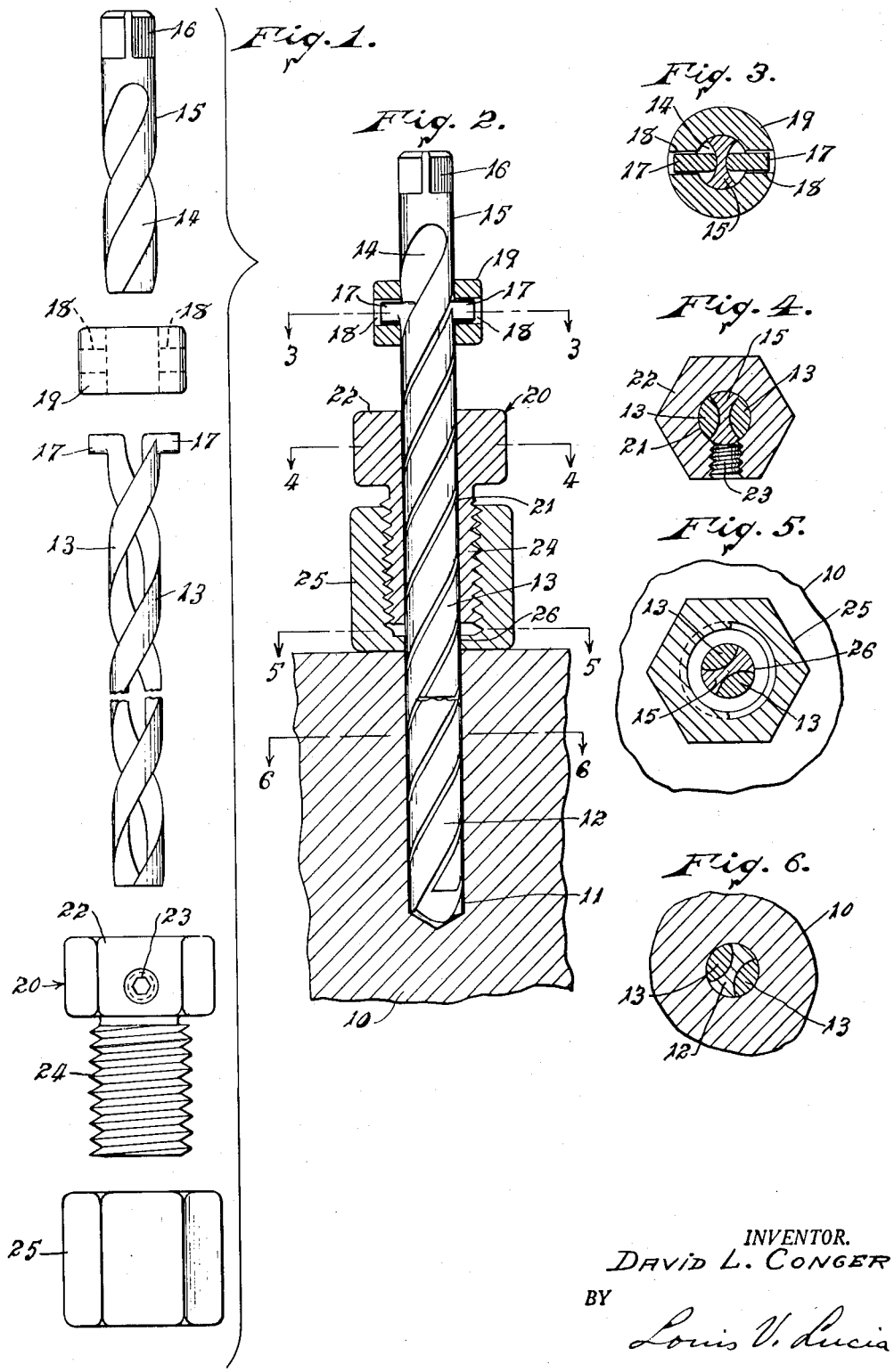
May 8, 1956     D. L. CONGER     2,744,312
BROKEN DRILL EXTRACTOR
Filed Oct. 6, 1951
INVENTOR.
DAVID L. CONGER
BY
Louis V. Lucia
ATTORNEY

BROKEN DRILL EXTRACTOR

David L. Conger, Middle Haddam, Conn., assignor to The Walton Company, Hartford, Conn., a corporation of Connecticut Application October 6, 1951, Serial No. 250,125

3 Claims. (Cl. 29—256)

This invention relates to a broken drill extractor and more particularly to a device for extracting the ends of broken drills from holes.

It is an object of this invention to provide such an extractor which is easy to use and highly efficient in the operation of extracting broken-off portions of drills of different sizes.

Further objects and advantages of this invention will be more clearly understood from the following description and the accompanying drawings in which:

Fig. 1 is an exploded side view showing different parts of my improved drill extractor.

Fig. 2 is a side view, partly in central vertical section illustrating the operation of the said extractor in extracting a broken-off portion of a drill.

Fig. 3 is a sectional plan view on line 3—3 of Fig. 2.

Fig. 4 is a similar view on line 4—4 of Fig. 2.

Fig. 5 is a similar view on line 5—5 of Fig. 2.

Fig. 6 is a similar view on line 6—6 of Fig. 2.

As illustrated in the drawings, the numeral 10 denotes a work piece, in which a hole 11 is being drilled, and the numeral 12 denotes the end portion of a drill which has broken off during the drilling of said hole.

My improved extractor preferably comprises a pair of opposed spirally-shaped fingers 13—13 which are adapted to fit within the flutes 14 of a drill-shaped guide member 15 which is preferably provided with a squared head portion 16 that is adapted to be received in a suitable tool to permit turning of said guide member.

The upper end of each of the fingers 13 is provided with an outwardly disposed supporting tang 17 which fits within a hole 18 in a connecting collar 19 that is adapted to slidably receive the guide member 15.

The said guide member, with the fingers 13—13 positioned in the flutes 14 therefore, is slidably contained in a holder 20 and fits within an axial opening 21 which extends through the said holder and firmly retains the said fingers within the flutes of the guide member 15. The holder is preferably provided with an hexagonal head 22 having a set screw 23 which extends into the opening 21 and engages said guide member and fingers to adjustably secure them in assembled position within the holder.

The holder 20 is provided with a threaded shank 24 to which there is threaded a jack nut 25 for pulling the broken drill out of the hole. The outer surfaces of the fingers are preferably flush with the surface of the guide member and the jack nut has a hole 26 at the bottom thereof which is of substantially the same diameter as the hole 21 so the wall thereof will engage and snugly retain the fingers 13 within the flutes of the guide member 15 at a point which is close to the end of the broken drill portion 12, as illustrated in Fig. 2 of the drawings.

The operation of my improved drill extractor is as follows:

Assuming that during the drilling of a hole, indicated at 11, in a piece of work 10 the end portion of the drill 12 is broken off in said hole, as shown, and that the chips have been removed from said hole by some suitable means, the ends of the fingers 13 are first inserted into the flutes of the broken drill portion 12 and the said fingers are turned, by means of the collar 19, into the said flutes of the said broken drill portion until they have been extended into said flutes as far as possible. The guide member 15 is then rotated between the said fingers until the end thereof is brought into abutment with the end of the broken drill portion. The holder 20, with the jack nut 25 thereon, is then moved into position against the surface of the work piece 10 and the set screw 23 is tightened to thereby clamp the said fingers and the guide member 15 to the holder 20 so that they will operate as a rigid unit.

When the extractor has been thus attached to the broken drill portion 12, the head 22 of the holder is engaged with a suitable tool and the unit comprising the holder, the guide 15 and the fingers 13—13 is turned in opposite directions until the broken drill portion is loosened within the hole 11 and the said drill portion may be readily extracted from the hole.

In the event that the drill portion cannot be easily extracted, the said holder may be held against rotation and the jack nut 25 rotated relatively to the holder so as to unscrew the said nut on the shank 24 of the holder and thereby force the unit upwardly to carry the drill portion 12 therewith and thereby extract it from the hole in the work piece.

It will be noted that the walls of the hole 26 in the jack nut 25 provided for closely retaining the fingers 13—13 in engagement with the guide member 15 at a point which is as close as possible to the broken drill portion to thereby permit a turning force to be applied to the broken drill portion through the said fingers at a point close to the end of the said drill portion and thereby eliminate the possibility of bending or distorting the said fingers when excessive torque is applied therethrough.

I claim:

1. A broken drill extractor comprising a guide member having spiral flutes in the sides thereof, a pair of spiral fingers fitting within said flutes, a holder having an opening extending longitudinally therethrough for adjustably receiving said guide member with the spiral fingers in said flutes, fastening means on said holder for adjustably securing the said guide member and fingers thereto, and a jack member co-axial with the holder and threaded thereto.

2. A broken drill extractor comprising an elongated drill-like guide member having spiral flutes in the sides thereof, a pair of spiral fingers fitting within said flutes with the surfaces thereof substantially flush with the outer surface of the guide member, a holder having an axial opening therethrough for adjustably receiving said guide member and fingers, means for securing the said guide member, fingers, and holder in relatively adjusted positions, a co-axial shank on said holder, and a jack nut co-axial with said holder and threaded to said shank; the said nut having an opening in the bottom thereof of substantially the same diameter as the opening in the holder to receive the said guide member and fingers and retain the said fingers within the flutes at a point close to the end of the guide member.

3. A broken drill extractor comprising a drill-like guide member having opposed spiral flutes in the sides thereof, a pair of spiral fingers fitting within said flutes, a collar surrounding said guide member and connecting said spiral fingers, the said fingers being adjustable relatively to the guide member whereby the ends of the fingers may be projected beyond the end of the guide member for different distances, a holder having an axial opening extending therethrough, fastening means in said holder for adjustably securing the said guide member, fingers and holder into a rigid unit, the said holder having a head portion and a threaded shank extending therefrom co-axial with the opening in said holder, and a jack nut threaded to said shank and adapted to engage the surface adjacent to a hole from which a portion of a broken drill is to be extracted; the end portion of said jack nut having a hole therein for receiving said guide member and spiral fingers and closely surrounding the same for retaining the fingers within the flutes at a point close to the broken drill.

References Cited in the file of this patent

UNITED STATES PATENTS

| | | |
|---|---|---|
| 678,176 | Lamacchia | July 9, 1901 |
| 702,011 | Kinvall | June 10, 1902 |
| 1,328,362 | Bordeaux | Jan. 20, 1920 |
| 1,593,437 | Champagne | July 20, 1926 |
| 1,631,889 | Rappley | June 7, 1927 |

FOREIGN PATENTS

| | | |
|---|---|---|
| 92,100 | Sweden | Apr. 21, 1938 |